United States Patent
Zhang et al.

(10) Patent No.: US 10,317,733 B2
(45) Date of Patent: Jun. 11, 2019

(54) METHOD TO MAKE LCOS OXIDE ALIGNMENT LAYER BY OFFSET PRINT

(71) Applicant: OmniVision Technologies, Inc., Santa Clara, CA (US)

(72) Inventors: Ming Zhang, Fremont, CA (US); Yin Qian, Milpitas, CA (US); Libo Weng, San Jose, CA (US); Oray Orkun Cellek, Mountain View, CA (US); Dyson Hsin-Chih Tai, San Jose, CA (US); Lequn Liu, San Jose, CA (US); Dominic Massetti, Seal Beach, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/334,488

(22) Filed: Oct. 26, 2016

(65) Prior Publication Data

US 2018/0113336 A1  Apr. 26, 2018

(51) Int. Cl.
*G02F 1/13* (2006.01)
*G02F 1/1335* (2006.01)
(Continued)

(52) U.S. Cl.
CPC ...... *G02F 1/1337* (2013.01); *G02F 1/133553* (2013.01); *G02F 1/1303* (2013.01);
(Continued)

(58) Field of Classification Search
CPC .......... G02F 1/13439; G02F 1/133553; G02F 2202/105; G02F 2202/36; G02F 1/133788; G02F 1/133707; G02F 1/133753; G02F 1/13378; G02F 1/133784; G02F 1/3775; G02F 1/133719; G02F 1/0027; G02F 1/141; G02F 2001/133738; G02F 2001/133769; G02F 2001/133776; G02F 2001/13787;
(Continued)

(56) References Cited

U.S. PATENT DOCUMENTS

2007/0273812 A1 * 11/2007 Bone ................. G02F 1/133553
349/113
2009/0195742 A1 * 8/2009 Fu .......................... B82Y 20/00
349/128

(Continued)

FOREIGN PATENT DOCUMENTS

JP        2008032853 A  *  2/2008

OTHER PUBLICATIONS

Cho, H. et al. "High-Rate Nanoscale Offset Printing Process Using Directed Assembly and Transfer of Nanomaterials"; Advanced Materials, vol. 27; Feb. 3, 2015; pp. 1759-1766.*
(Continued)

*Primary Examiner* — Shan Liu
(74) *Attorney, Agent, or Firm* — Larry E. Henneman, Jr.; Henneman & Associates, PLC

(57) ABSTRACT

An alignment layer for a liquid crystal on silicon (LCOS) display includes a nano-particle layer. In a particular embodiment the nano-particle layer includes a lower nano-layer and an upper nano-layer, each formed onto oxide layers of the LCOS display. In a more particular embodiment, the lower nano-layer and the upper nano-layer are offset printed onto the oxide layers.

7 Claims, 11 Drawing Sheets

(51) Int. Cl.
*G02F 1/1337* (2006.01)
*G02F 1/1362* (2006.01)

(52) U.S. Cl.
CPC ............ *G02F 2001/136281* (2013.01); *G02F 2202/105* (2013.01); *G02F 2202/36* (2013.01)

(58) Field of Classification Search
CPC ........ G02F 2001/133746; G02F 2001/133749; G02F 2001/133773; G02F 2001/3548; G02F 2001/133742; G02F 2001/133761; G02F 1/13; G02F 1/0018; G02F 1/133365; G02F 2001/13775; G02F 2202/00; G02F 2202/02; G02F 2202/021; G02F 2202/022; G02F 2202/023; G02F 2202/025; G02F 2202/20; G02F 2202/30; G02F 2202/34; G02F 2202/42; G02F 1/1337; G02F 1/133711; G02F 1/133703; G02F 2001/133715; G02F 2001/133726; G02F 2001/133796; G02F 1/133734; G09G 2300/0495; G09G 2300/0486; H01L 21/02211; H05K 3/389; C08F 259/08; C09K 19/04; C09K 19/56; C09K 19/38; C09K 2019/548; Y10T 428/10; Y10T 428/1005; Y10T 428/1009; B32B 2305/55; B32B 2457/202; B32B 17/10504
USPC .................. 349/123–136; 428/1.1, 1.2, 1.21
See application file for complete search history.

(56) References Cited

U.S. PATENT DOCUMENTS

| | | | | |
|---|---|---|---|---|
| 2010/0068485 | A1* | 3/2010 | Ounaies | B32B 27/20 428/212 |
| 2012/0176575 | A1* | 7/2012 | Matsumoto | G02F 1/1337 349/124 |
| 2012/0292285 | A1* | 11/2012 | Kontos | G11B 5/855 216/12 |
| 2014/0346436 | A1* | 11/2014 | Li | H01L 21/02532 257/9 |
| 2016/0048045 | A1* | 2/2016 | Imai | G02F 1/1337 349/123 |
| 2016/0060529 | A1* | 3/2016 | Hegmann | C09K 19/52 349/123 |
| 2016/0254407 | A1* | 9/2016 | Wang | H01L 31/035227 136/256 |

OTHER PUBLICATIONS

English translation of JP 2008032853 A, Title: Liquid Crystal Alignment Layer, Method of Manufacturing Liquid Crystal Alignment Layer, and Liquid Crystal Element, Author: Ishida, Yohei; Date of publication: Feb. 14, 2008.*

Huang, Y. et al.; "Comparison of Organic and Inorganic Alignment Layers for Low-Power Liquid Crystal Devices Using Low-Frequency Applied Voltage Waveforms"; *Journal of the Society for Information Display*; vol. 18, Issue 3; Mar. 2010; pp. 206-210.

* cited by examiner

METHOD TO MAKE LCOS OXIDE ALIGNMENT LAYER BY OFFSET PRINT

BACKGROUND OF THE INVENTION

Field of the Invention

This invention relates generally to liquid crystal displays, and more particularly to forming alignment layers on liquid crystal displays.

Description of the Background Art

Liquid crystal (LC) displays are known. LC displays (LCDs) utilize optically active materials that affect the polarization of light passing therethrough based on their alignment and the electric field to which they are exposed. This attribute of LCs is utilized for modulating light on a pixel-by-pixel basis in a display. In order to properly align liquid crystals, manufacturers of LC displays apply a polymer layer (e.g. a polyimide layer) on both sides of the LC layer. The polymer layer is then rubbed in a pre-designed direction, causing surface effects that align the LC molecules along the rubbing direction.

Rubbing is not capable of generating nanometer scale uniform alignment features on surface. For applications of LCs on silicon substrates (i.e. LCOS), the polyimide layer must be thin, and so the rubbing force must be relatively low so as not to damage polyimide layer. As a result, the LC alignment in LCOS devices is not as complete as it could be in LCDs.

SUMMARY

The present invention overcomes the problems associated with the prior art by providing an improved liquid crystal alignment layer and a method of manufacturing the improved liquid crystal alignment layer. The invention facilitates the manufacture of improved liquid crystal display devices.

An example method of manufacturing a liquid crystal display includes providing a substrate of the liquid crystal display, applying a liquid crystal alignment pattern to the substrate using a lithography process, and assembling the substrate into the liquid crystal device with the liquid crystal alignment layer adjacent a liquid crystal layer of the liquid crystal device. In a particular example method, the liquid crystal display is a liquid crystal on silicon (LCOS) device. The substrate can be a reflective backplane or a transparent electrode of the display device (e.g., LCOS).

The example method can additionally include providing a second substrate of the liquid crystal display, applying a liquid crystal alignment pattern to the second substrate using a lithography process, and assembling the second substrate into the liquid crystal device with the liquid crystal alignment layer of the second substrate adjacent the liquid crystal layer of the liquid crystal device. In a particular example method, the substrate is a reflective backplane of the liquid crystal display, and the second substrate is a transparent electrode of the liquid crystal display.

In a disclosed method, the lithography process is a nano offset printing process that includes providing a template and patterning a nano-pattern onto the template. The method additionally includes adhering a first plurality of nano-particles onto the nano-pattern on the template and transferring the first plurality of nano-particles to the first substrate to form the liquid crystal alignment layer on the first substrate. The liquid crystal alignment pattern corresponds to the nano-pattern. In an example method, the nano pattern includes a plurality of parallel lines having a pitch smaller than 50 nanometers (nm). In a more particular example, the nano-pattern includes a plurality of parallel lines having a pitch no greater than 20 nm.

Optionally, the nano-particles are made from materials having a dielectric constant greater than the dielectric constant of polyimide. As another option, the nano-particles are made from materials having a dielectric constant greater than or equal to 7. Example nano-particles include Silicon, Germanium, Silicon-Germanium alloy, Carbon-nanotubes, Silicon-Carbon alloy, Germanium-Carbon alloy, Silicon Nitride, Germanium Oxide, Silicon Oxide, or some combination thereof.

An example liquid crystal display device includes a substrate, a printed liquid crystal alignment layer on the substrate, and a liquid crystal layer adjacent the printed liquid crystal alignment layer. In the specific example, the liquid crystal device is a liquid crystal on silicon (LCOS) device. The substrate can be the reflective backplane or the transparent electrode.

A more particular example embodiment additionally includes a second substrate disposed on an opposite side of the liquid crystal layer as the first substrate and a second liquid crystal alignment layer printed on a surface of the second substrate adjacent the liquid crystal layer. The first substrate is a reflective backplane, and the second substrate is a transparent electrode.

In the example embodiment, the printed liquid crystal alignment layer includes a pattern of nano-particles. The pattern includes a plurality of parallel lines having a pitch smaller than 50 nanometers. Optionally, the pitch of the plurality of parallel lines is less than or equal to 20 nanometers. The nano-particles can include Silicon, Germanium; Silicon-Germanium alloy, Carbon-nanotubes, Silicon-Carbon alloy, Germanium-Carbon alloy, Silicon Nitride, Germanium Oxide, Silicon Oxide particles, or some combination thereof.

In the example embodiment, the printed liquid crystal alignment layer has a dielectric constant greater than the dielectric constant of polyimide. Optionally, the printed liquid crystal alignment layer has a dielectric constant greater than or equal to 7.

BRIEF DESCRIPTION OF THE DRAWINGS

The present invention is described with reference to the following drawings, wherein like reference numbers denote substantially similar elements.

DETAILED DESCRIPTION

Figure 1:
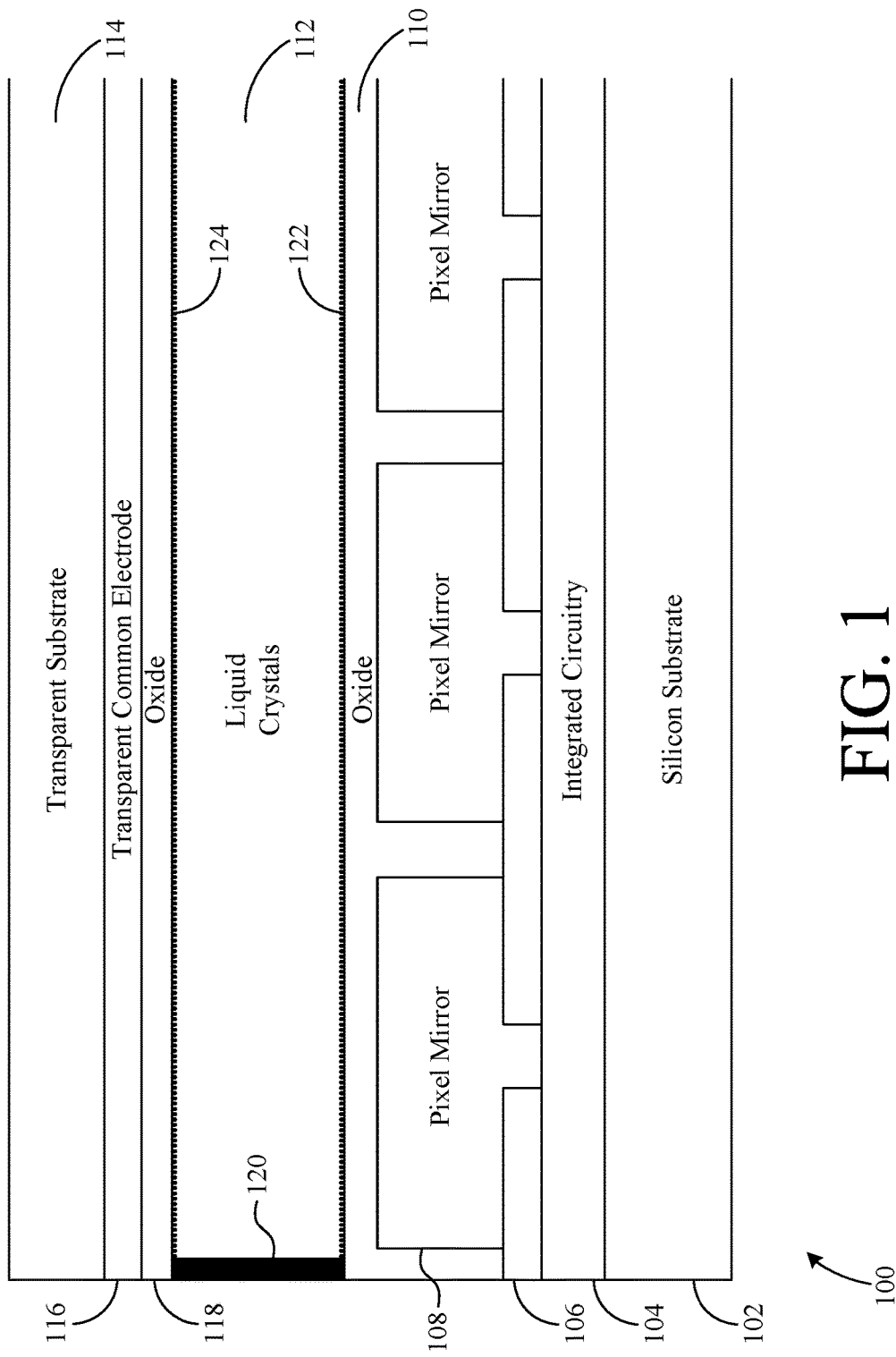
FIG. 1 is a cross-sectional view of portion of a liquid crystal on silicon (LCoS) display with printed liquid crystal alignment layers.

The present invention overcomes the problems associated with the prior art, by providing an improved alignment layer for a liquid crystal display (LCD), which can be manufactured at low cost and high throughput. In the following description, numerous specific details are set forth (e.g., specific processes, dimensions, materials, etc.) in order to provide a thorough understanding of the invention. Those skilled in the art will recognize, however, that the invention may be practiced apart from these specific details. In other instances, details of well-known LCD practices (e.g., microchip fabrication techniques, LCD assembly, etc.) and components have been omitted, so as not to unnecessarily obscure the present invention.

The relative dimensions of the layers and elements depicted in the drawings are not drawn to scale. Rather, the drawings are intended to convey a clear understanding of various aspects of the invention.

FIG. 1 shows a cross section of a portion of liquid crystal on silicon (LCoS) display 100, including a silicon substrate 102, at least one integrated circuitry layer 104, an insulating layer 106, a plurality of pixel mirrors 108, an oxide passivation layer 110, a liquid crystal layer 112, a transparent substrate 114, a transparent common electrode 116, and an oxide layer 118.

Integrated circuitry layer 104, insulating layer 106, pixel mirrors 108 and oxide layer 110 are formed on silicon substrate 102 using know microchip fabrication techniques and, together, form a reflective backplane of LCoS display 100. Integrated circuitry layer 104 includes electronic elements (e.g. transistors) that impart functionality to LCOS display 100. Pixel mirrors 108 are electrically coupled to integrated circuitry layer 104 through a plurality of vias formed in insulating layer 106.

Transparent common electrode 116 is a thin conductive layer (e.g., indium-tin-oxide) formed on transparent substrate 114 (e.g., a glass plate). Oxide layer 118 is a silicon dioxide layer formed on transparent common electrode 116. Together, transparent substrate 114, transparent common electrode 116, and oxide layer 118 form a transparent cover of LCoS display 100. A gasket 120 (only a portion shown) surrounds liquid crystal layer 112 and fixes the reflective backplane of LCoS display 100 to the transparent cover of LCoS display 100, thereby retaining liquid crystal layer 112 therebetween.

Liquid crystal (LC) alignment layers 122 and 124 are printed on oxide layers 110 and 118, respectively, and are in direct contact with liquid crystal layer 112. More particularly, liquid crystal alignment layers 122 and 124 are formed by an offset lithography (printing) process. In this example embodiment, LC alignment layers 122 and 124 are nano-patterns formed by a nano offset printing process that will be described in greater detail below. Nano-layers 122 and 124 determine a resting alignment of LC layer 118, which can be configured based on certain details of the pattern formed by nano-layers 122 and 124. Forming LC alignment layer 122 and/or LC alignment layer 124 using an offset lithography process provides important advantages over alignment layers of the prior art. The advantages include, but are not limited to, more uniform alignment layers, smaller pitch of the alignment pattern, less chance of damaging underlying layers, and improved electrical performance of the alignment pattern material.

LCOS display 100 modulates incident light based on control signals received from a controller (not shown) and reflects the light back toward optics, a screen, or a viewer. In response to the control signals, integrated circuitry layer 104 asserts a voltage on each of pixel mirrors 108. Depending on the relative voltages asserted on each of pixel mirrors 108 and transparent common electrode 116, an electric field is created across LC layer 118. The electric field alters the alignment of the liquid crystals of LC layer 118, which, in turn, alters the polarization orientation of incident light. Pixel mirrors 108 reflect the incident light, the liquid crystals alter the polarization orientation of the reflected light again, and the modulated light passes through a polarized analyzer filter (not shown). Based on the alignment of the liquid crystals through which the light passes and on the polarization orientation of the polarized filter, a pixel of light (i.e. the light reflected by one of pixel mirrors 108) will appear bright, dark, or at some intermediate brightness. Because each of pixel mirrors 108 can have an independent voltage asserted thereon, light is spatially modulated and an image can be generated.

Figure 2:
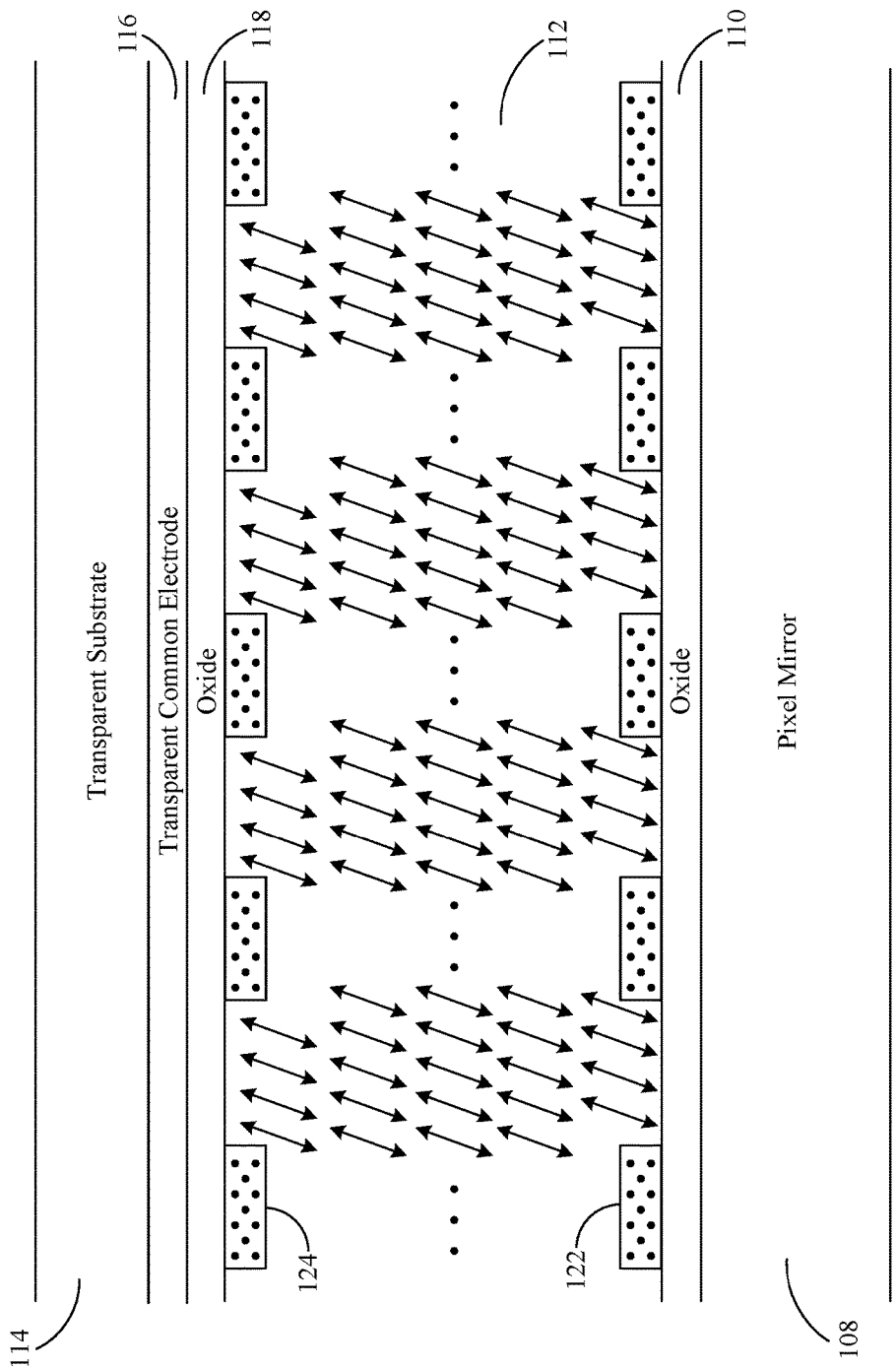
FIG. 2 is a cross-sectional view of a smaller portion of the LCoS display of FIG. 1 showing the alignment layer in greater detail.

FIG. 2 is an enlarged view of LC alignment layers 122 and 124, and illustrates the function of liquid crystal alignment layers 122 and 124. In particular, liquid crystal alignment layers 122 and 124 interact with the surfaces of liquid crystal layer 112 to align the liquid crystals in a predetermined orientation in their relaxed state. In the example of FIG. 2, the slightly tilted alignment of the liquid crystals prevents them from tilting in different directions when an electrical field is applied. In other types of liquid crystal devices, the relative orientations of the alignment patterns create a twist in the orientation of the liquid crystals.

Liquid crystal alignment layers 122 and 124 include a pattern of nano-particles adhered to oxide layers 110 and 118, respectively. In this example embodiment, the nano-particles are carbon nano-tubules, arranged in a predetermined LC alignment pattern. Alternate nano-particles including, but are not limited to, silicon, germanium, silicon-germanium alloy, silicon-carbon alloy, germanium-carbon alloy, silicon nitride, germanium oxide, silicon oxide particles, and/or combination thereof can be used to form LC alignment layers 122 and 124. Additionally, the operation of LCOS display 100 can be improved based on the dielectric features of the nano-particles used to form LC alignment layers 122 and 124. The strength of the electric field between global electrode 112 and local electrodes 108 depends on the dielectric constants of the materials, through which the field passes. Displays with LC alignment layers made with materials having a high dielectric constant, require less power to operate and have quicker response times than traditional LCOS displays. LC alignment layers with a dielectric constant greater than the dielectric constant of polyimide provide an improvement over known LC displays with a polyimide rub layer. A wide-range of particles with high dielectric constants can be used to create LC alignment layers 122 and 124. Particles, with a dielectric constant greater than 7 (e.g. germanium particles) provide a significant improvement over alignment layers of the prior art.

Figure 3:
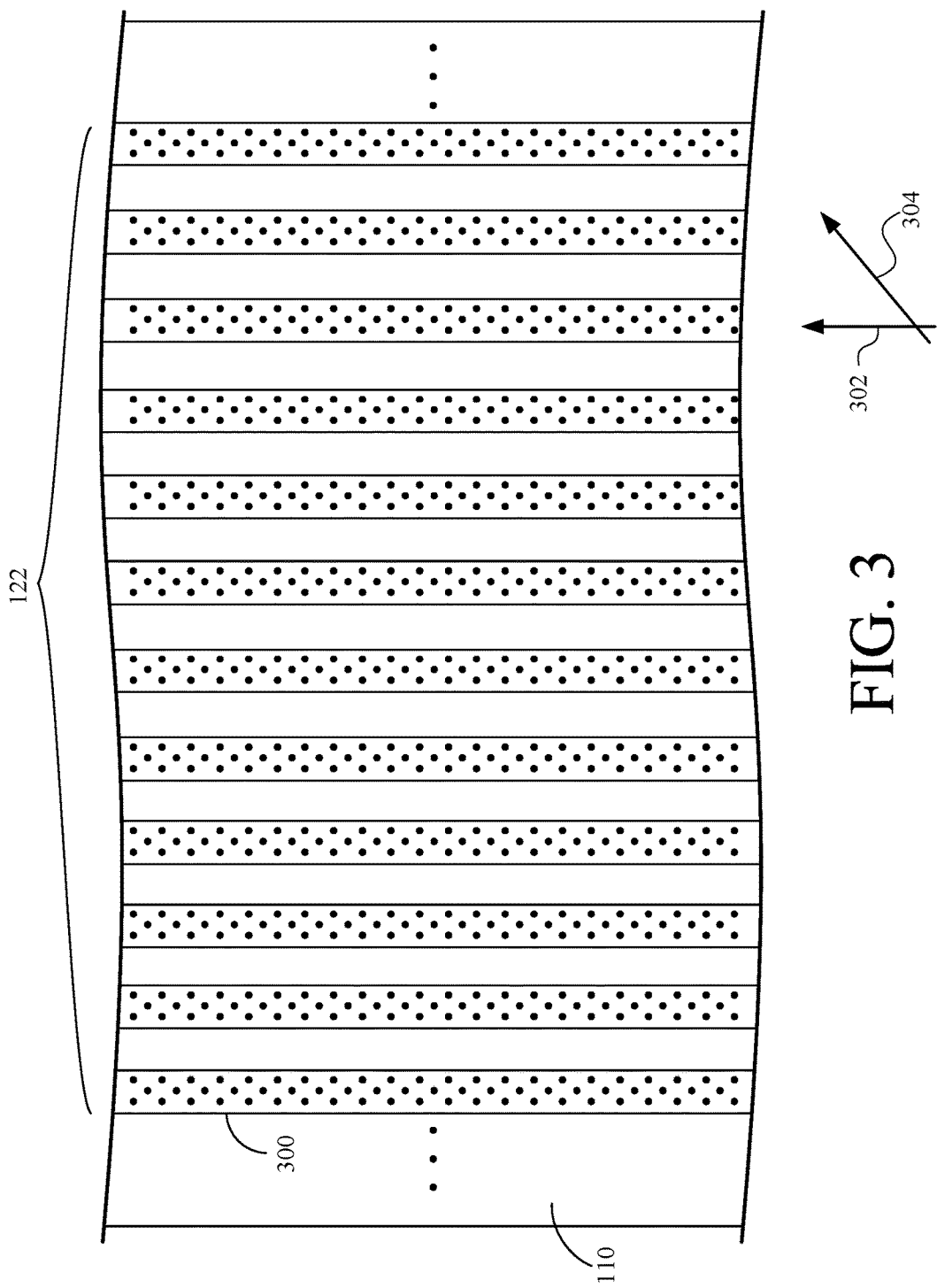
FIG. 3 is a top-down view of the lower oxide layer of FIG. 2 with the alignment layer printed thereon.

FIG. 3 shows a top-down view of lower oxide layer 114 with LC alignment layer 122 printed thereon. LC alignment layer 122 includes a plurality of parallel stripes 300 arranged at a predetermined pitch. Using methods described in the present disclosure, a pitch as small as 20 nanometers (nm)

can be realized. The inventors have found that a pitch of between 20-50 nanometers is advantageous.

Upper LC alignment layer 124 (FIG. 2) is typically formed in a similar pattern as lower nano-layer 122. However, depending on the particular application, LC alignment layers 122 and 124 can be arranged in an offset or angular relationship with respect to one another. For example, one possible angular relationship is represented by the arrows 302 and 304 in FIG. 3, where arrow 302 represents the orientation of LC alignment layer 122, and arrow 304 represents the orientation of LC alignment layer 124.

In the drawings of this disclosure, LC alignment layer 122 and LC alignment layer 124 are shown to have an identical horizontal placement and angular orientation. However, this representation is only for the sake of clear explanation and easy understanding of the drawings. As indicated above, LC alignment layers 122 and 124 can be arranged in any offset or angular relationship with respect to one another, depending on the requirements of the particular application. Various LC devices might require varying alignment patterns, and the methods described in this disclosure enable a manufacturer to print a nano-particle LC alignment layer in any 2D pattern at a resolution achievable by the state of technology at that time.

FIGS. 4A-4E illustrate various steps involved in forming lower nano-layer 122 onto lower oxide layer 114 of LCOS display 100.

Figure 4A:
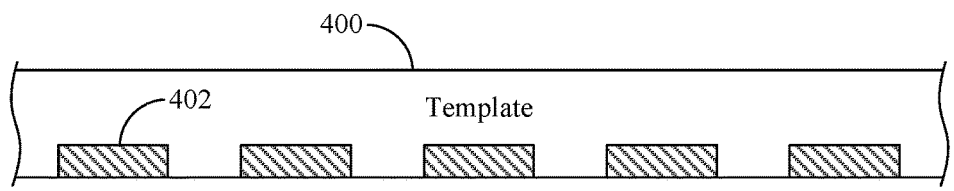
FIGS. 4A-4E are diagrams illustrating the printing of a nano-pattern (the liquid crystal alignment pattern) on the lower oxide layer of FIG. 2.

FIG. 4A shows a template 400 with a nano-pattern 402, corresponding to LC alignment layer 122, formed therein by processes known in the art. Known methods of forming nano-pattern 402 include, but are not limited to, electron-beam lithography.

Figure 4B:
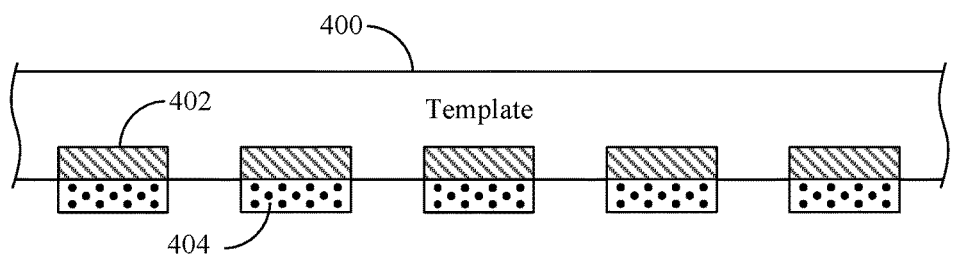

FIG. 4B shows template 400 after nano-pattern 402 is covered with nano-particles. Template 400 is immersed in a bath (not shown) of nano-particles and is connected as an electrode to create an electric field through the bath. The relative potential on template 400 causes the nano-particles to adhere to nano-pattern 402. The adhered nano-particles form an LC alignment layer 404, which will eventually be transferred to oxide layer 110 of LC device 100 as LC alignment layer 122. Depending on the nano-particles in the bath, template 400 can be coupled as either a cathode or an anode.

Figure 4C:
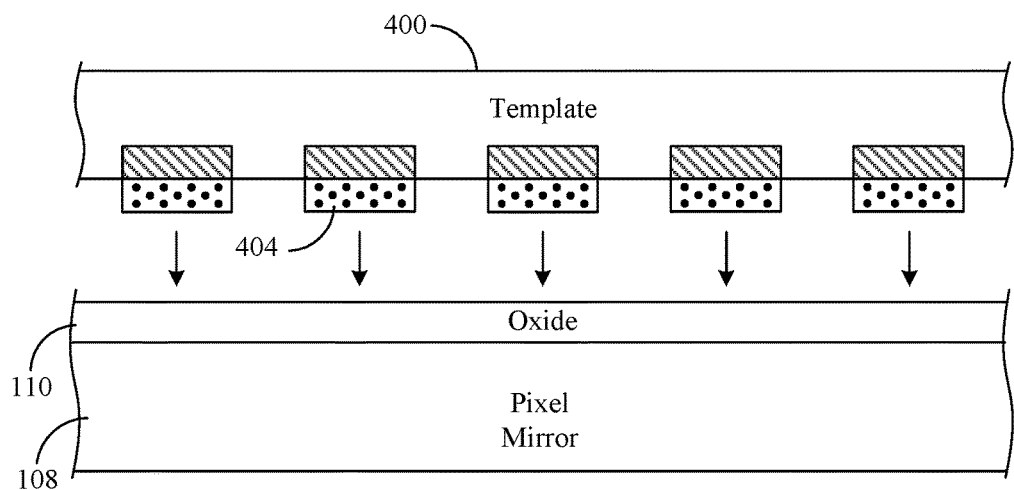

FIG. 4C shows template 400 being positioned over lower oxide layer 110. Template 400 is aligned and oriented with respect to the reflective backplane of LC 100, so that LC alignment layer 404 will be printed onto oxide layer 110 in the proper position and orientation as LC alignment layer 122. As indicated by the arrows in FIG. 4C, template 400 is lowered toward oxide layer 110, until LC alignment layer 404 contacts oxide layer 110.

Figure 4D:
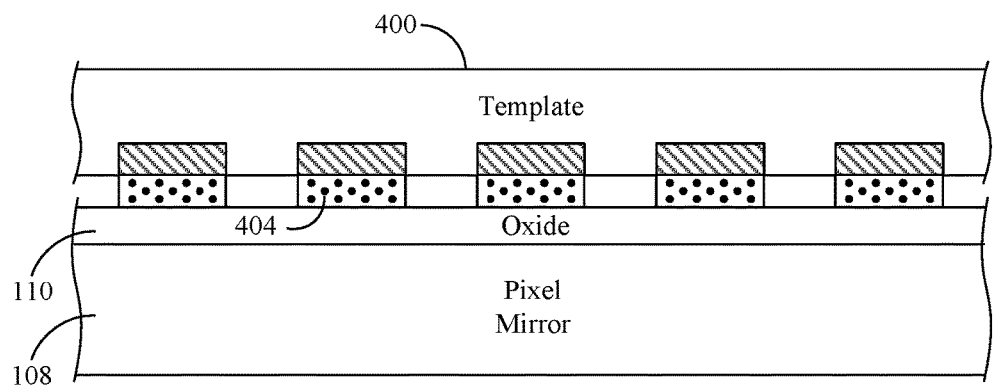

FIG. 4D shows template 400 positioned over oxide layer 110, with LC alignment layer 404 in contact with lower oxide layer 110. LC alignment layer 404 is adhered to oxide layer 110 by direct pressure between template 400 and the reflective backplane of LCoS display 100.

Figure 4E:
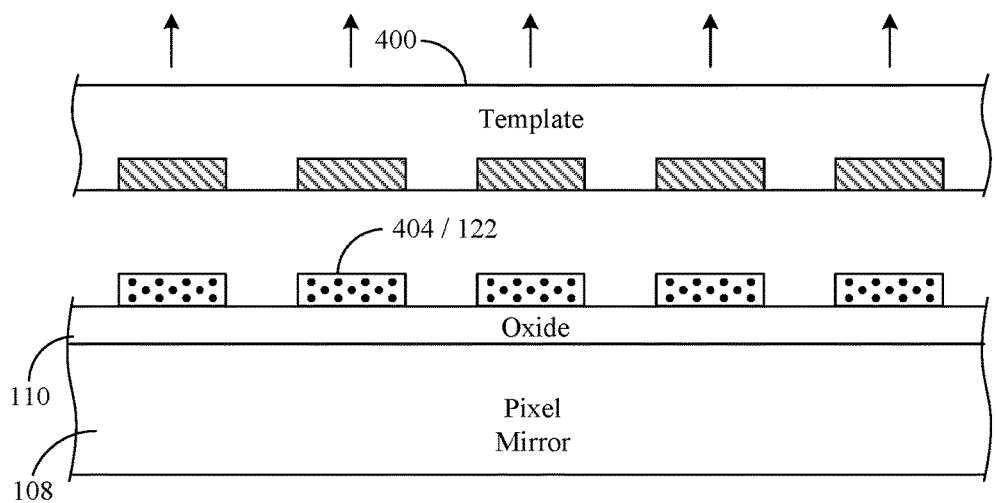

FIG. 4E shows template 400 being lifted away from lower oxide layer 110. LC alignment layer 404 remains in contact with oxide layer 110 and, as a result, is printed onto lower oxide layer 110 as LC alignment layer 122. Optionally, a releasing mechanism can be employed to assist the decoupling of LC alignment layer 404 from template 400. However, LC alignment layer provides such an improvement over the rub layers of the prior art that small defects resulting from the lithographic transfer of LC alignment layer 404/122 are inconsequential.

This process of printing LC alignment layer 122 onto oxide layer 110 using a nano offset printing process saves cost and increases throughput, because template 400 can be used repeatedly. In addition, the printing process decreases the chances of damaging the underlying layers.

FIGS. 5A-5E illustrate various steps involved in forming upper LC alignment layer 124 on upper oxide layer 118. The process is similar to the process described above with reference to FIGS. 4A-4E.

Figure 5A:
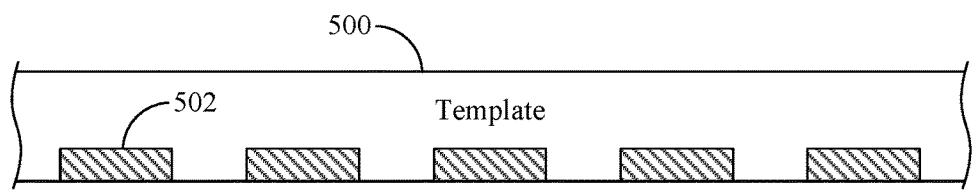
FIGS. 5A-5E are diagrams illustrating the printing of a nano-pattern (the liquid crystal alignment layer) on the transparent electrode of FIG. 2.

FIG. 5A shows a template 500 with a nano-pattern 502, corresponding to LC alignment layer 124, formed therein. Nano-pattern 502 may be similar to nano-pattern 402. Indeed, in the case where LC alignment pattern 122 and LC alignment pattern 124 are the same, template 400 can be used to print both LC alignment layer 122 on oxide layer 110 and to print LC alignment layer 124 on oxide layer 118. However, in many instances, LC alignment layer 124 will have at least a different orientation than LC alignment layer 122 and, therefore, nano-pattern 502 of template 500 will be different than nano-pattern 402 of template 400.

Figure 5B:
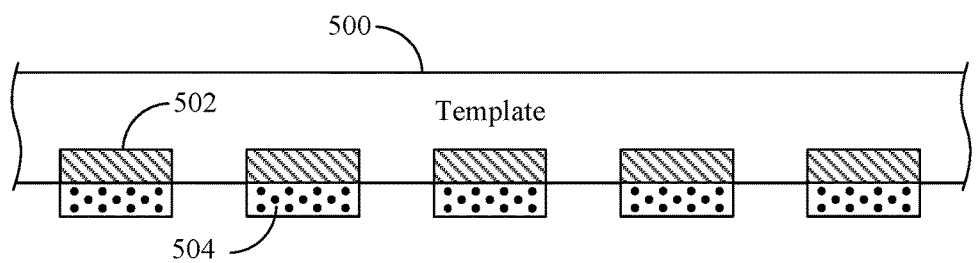

FIG. 5B shows template 500 after nano-pattern 502 is covered with nano-particles, by the same process described above with reference to FIG. 4B. The adhered nano-particles form an LC alignment layer 504, which will eventually be transferred to oxide layer 118 of the transparent cover of LC device 100 as LC alignment layer 124.

Figure 5C:
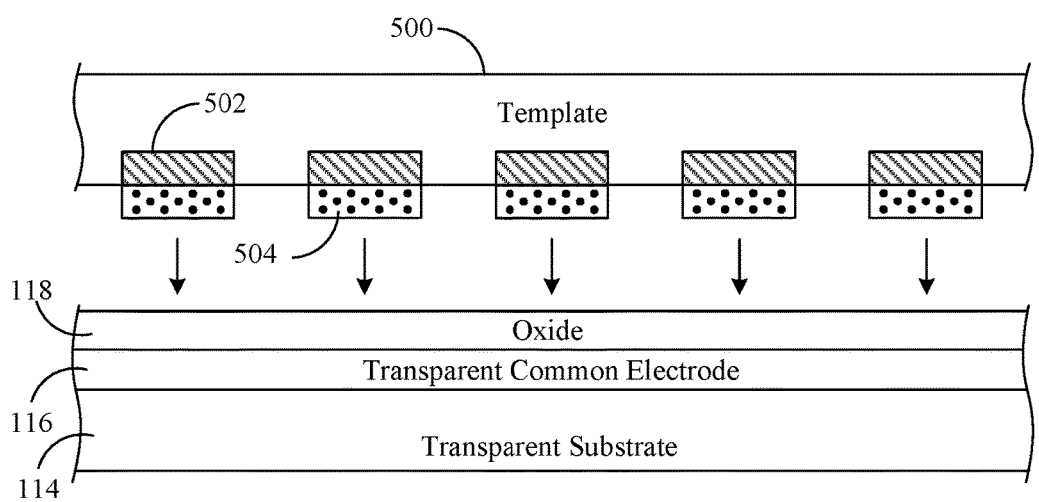

FIG. 5C shows template 500 being positioned over upper oxide layer 118. Transparent substrate 114, transparent common electrode 116, and upper oxide layer 118, which form the transparent cover of LCoS display 100 of FIG. 1, are shown in an inverted position with respect to FIG. 1, which may occur during this printing process. Template 500 is aligned and oriented with respect to the transparent cover of LCoS display 100, so that LC alignment layer 504 will be printed onto oxide layer 118 in the proper position and orientation as LC alignment layer 124. As indicated by the arrows in FIG. 5C, template 500 is lowered toward oxide layer 118, until LC alignment layer 504 contacts oxide layer 118.

Figure 5D:
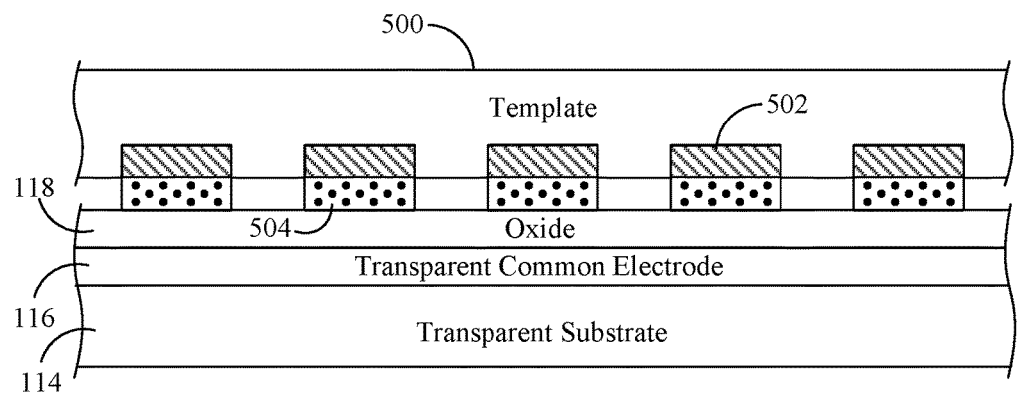

FIG. 5D shows template 500 positioned over oxide layer 118, with LC alignment layer 504 in contact with upper oxide layer 118. LC alignment layer 504 is adhered to oxide layer 110 by direct pressure between template 400 and the transparent cover of LCoS display 100.

Figure 5E:
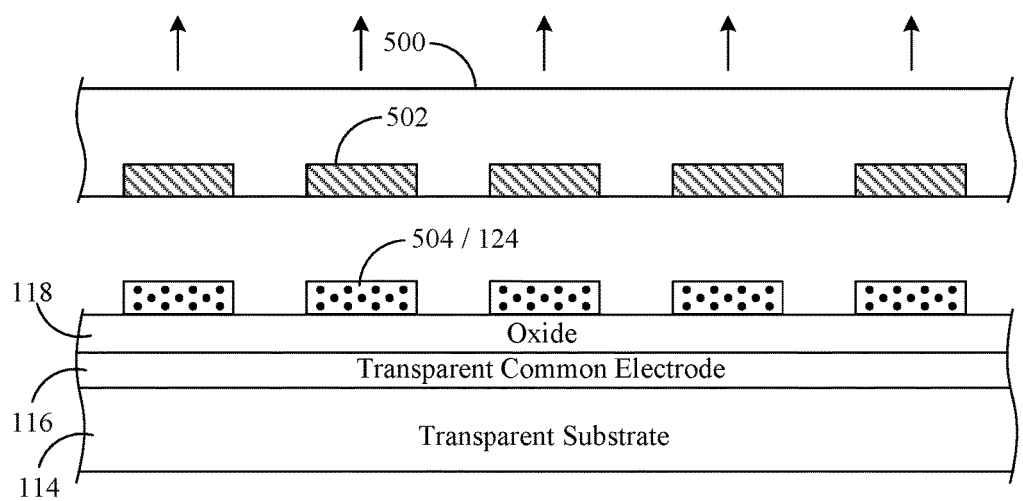

FIG. 5E shows template 500 being lifted away from upper oxide layer 118. LC alignment layer 504 remains in contact with oxide layer 118 and, as a result, is printed onto upper oxide layer 118 as LC alignment layer 124. Optionally, a releasing mechanism can be employed to assist the decoupling of LC alignment layer 504 from template 500.

This process of printing LC alignment layer 124 onto oxide layer 118 using a nano offset printing process, of course, provides the same advantages described above with respect to the printing of LC alignment layer 122.

FIGS. 6A-6D illustrate various steps involved in assembling LCOS display 100 after LC alignment pattern 122 has been printed onto lower oxide layer 110 and LC alignment pattern 124 has been printed on upper oxide layer 118.

Figure 6A:
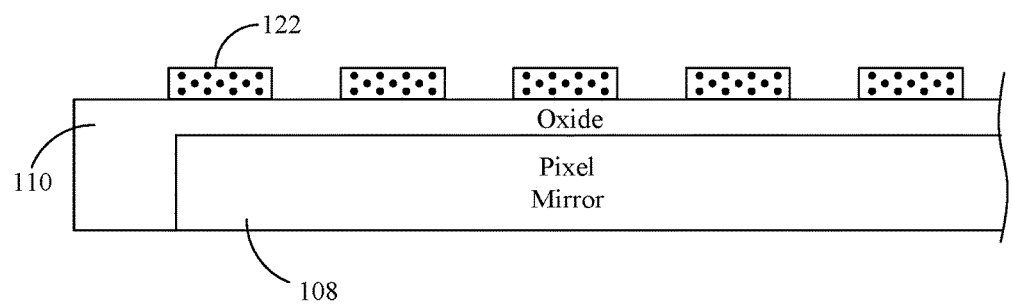
FIGS. 6A-6D are diagrams illustrating the assembly of the LCoS of FIG. 1.

FIG. 6A shows lower oxide layer 114 and LC alignment layer 122 of the reflective display backplane. For the sake of explanation, pixel mirror 108 is presumed to be located at the edge of an array of pixel mirrors 108 of LCoS display 100.

Figure 6B:
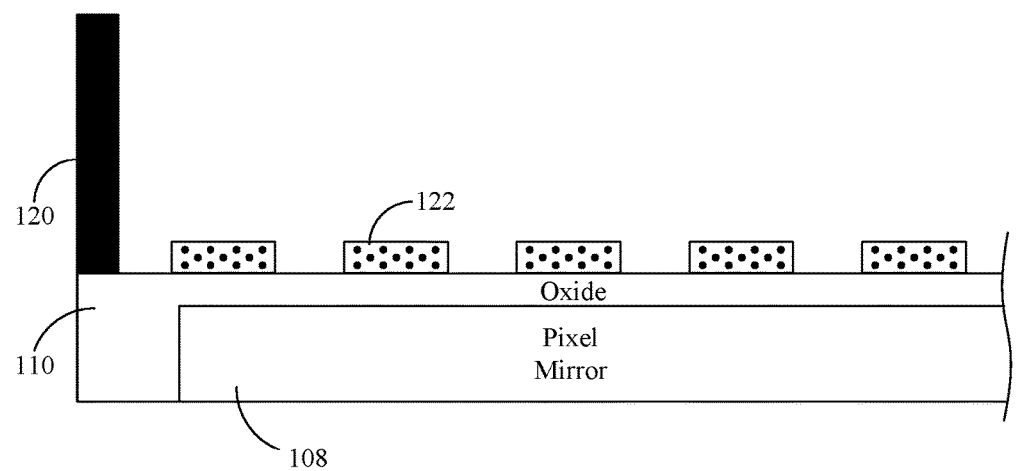

FIG. 6B shows an alignment gasket 120 positioned on oxide layer 110 adjacent LC alignment layer 122. Although only a portion of gasket 120 is shown, gasket 120 completely surrounds the array of pixel mirrors 120, except for an opening that facilitates the injection of liquid crystal material into the space overlying LC alignment layer 122.

Figure 6C:
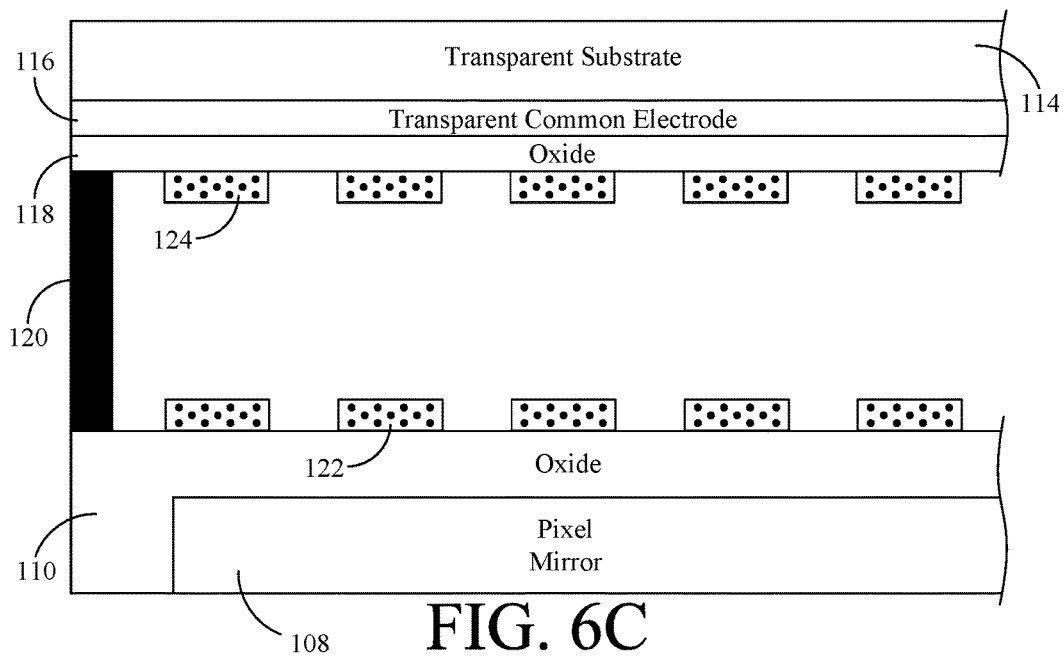

FIG. 6C shows the transparent cover, including transparent substrate 114, transparent common electrode 116, upper oxide layer 118, and LC alignment layer 124, positioned over gasket 120, which fixes the transparent cover of LCoS display 100 to the reflective backplane of LCoS display 100. So positioned, upper oxide layer 118 faces lower oxide layer 110 and defines a liquid crystal receiving space therebetween.

Figure 6D:
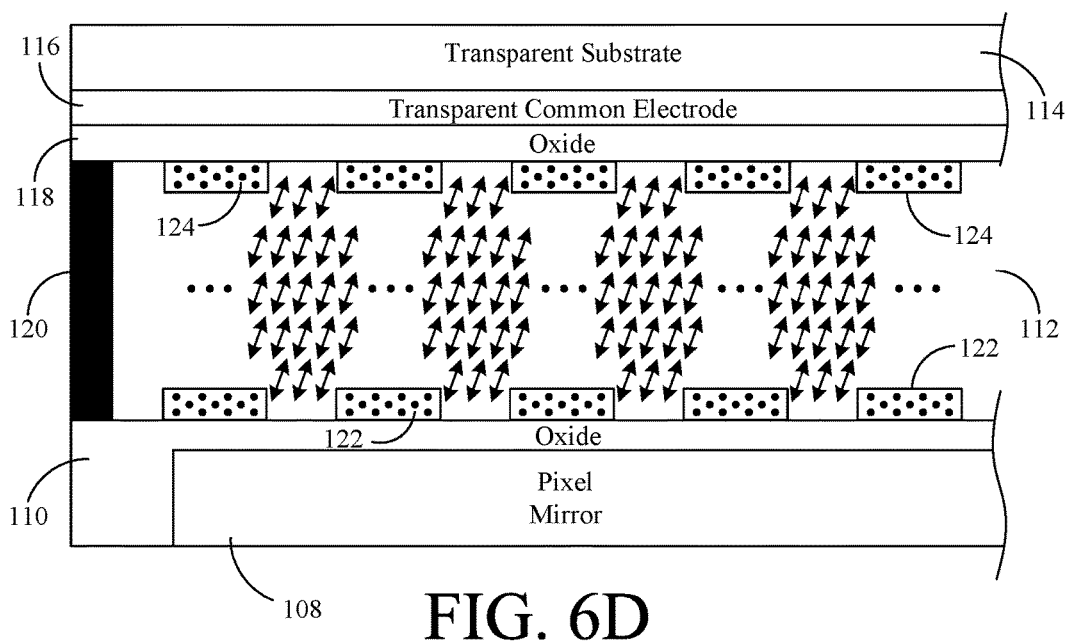

FIG. 6D shows liquid crystal layer 112, which has been injected through the opening in gasket 120 and into the space between lower oxide layer 110 and upper oxide layer 118. LC alignment layers 122 and 124 are in direct contact with liquid crystal layer 112 and effect the desired alignment of the liquid crystals. The opening in gasket 120 is sealed with a plug to retain the liquid crystal material within liquid crystal layer 112, and the assembly of LCoS display 100 is substantially complete.

Figure 7:
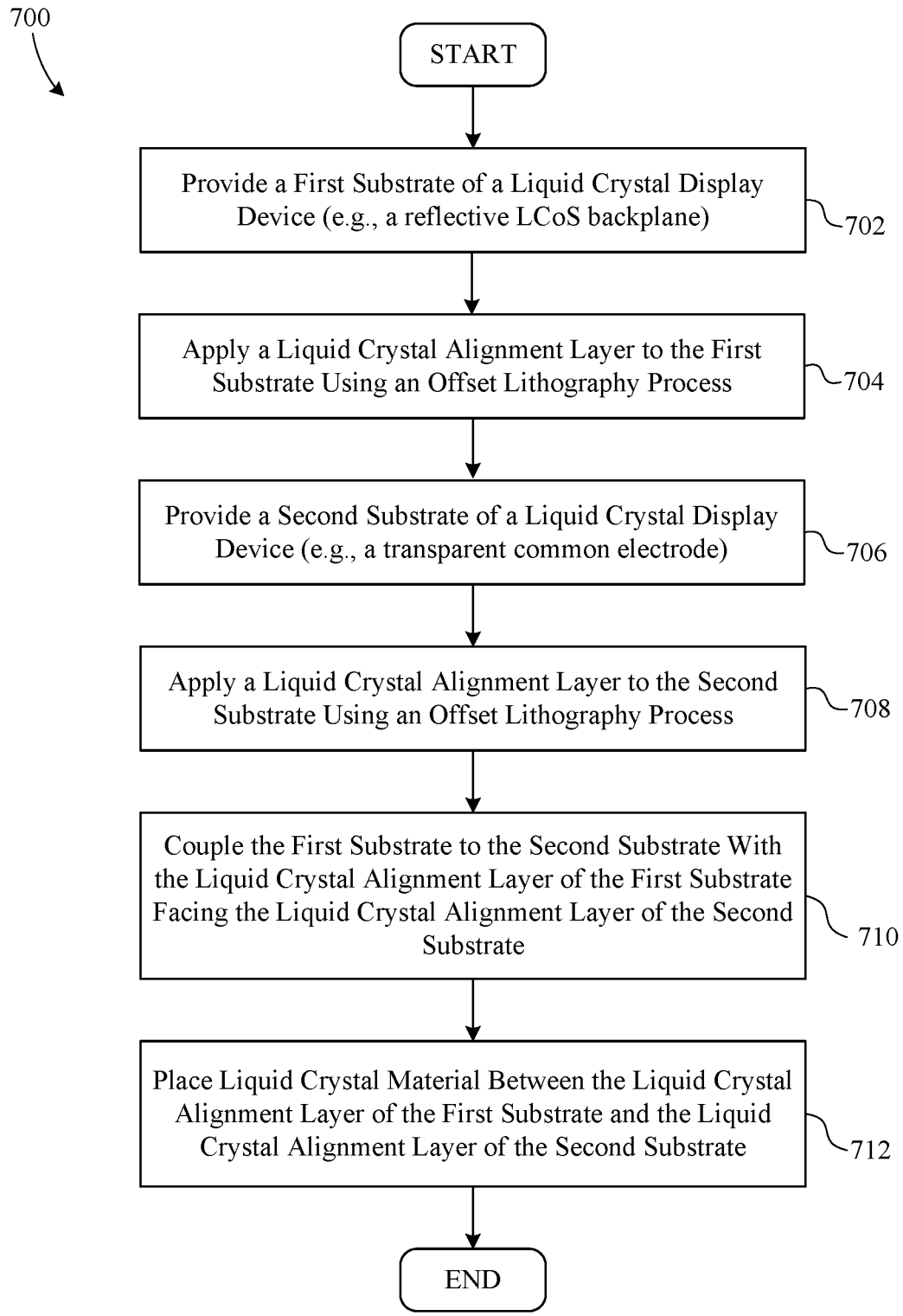
FIG. 7 is a flowchart illustrating an example method of manufacturing a liquid crystal display device.

FIG. 7 is a flow chart illustrating an example method 700 for manufacturing an LCOS display according to one aspect of the present invention. In a first step 702, a first substrate of a liquid crystal display device is provided. Next, in a second step 704, a liquid crystal alignment layer is applied the first substrate using an offset lithography process. Then, in a third step 706, a second substrate of the liquid crystal display device is provided. Next, in a fourth step 708, a liquid crystal alignment layer is applied to the second substrate using an offset lithography process. Then, in a fifth step 710, the first substrate is coupled to the second substrate with the liquid crystal alignment layer of the first substrate facing the liquid crystal alignment layer of the second substrate. Next, in a sixth step 712, Liquid crystal material is laced between the liquid crystal alignment layer of the first substrate and the liquid crystal alignment layer of the second substrate.

Figure 8:
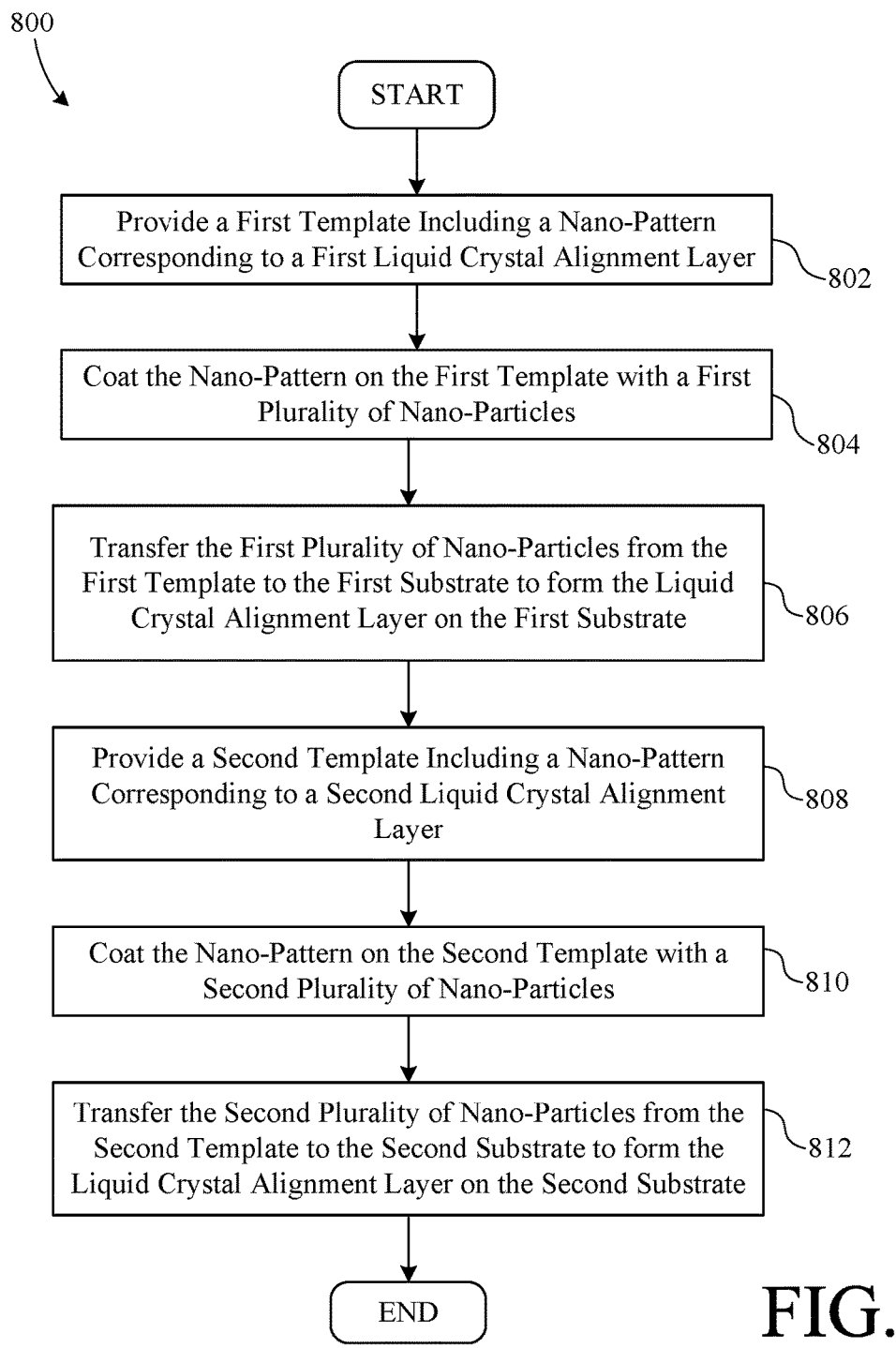
FIG. 8 is a flowchart illustrating an example method of performing the second and/or fourth steps of the method of FIG. 7.

FIG. 8 is a flowchart summarizing an example method 800 of performing step second step 704 (apply LC alignment layer to first substrate) and/or fourth step 708 (apply LC alignment layer to second substrate) of method 700. In a first step 802, a first template including a nano-pattern corresponding to a first liquid crystal alignment layer is provided. Then, in a second step 804, the nano-pattern corresponding to the first liquid crystal alignment is coated with a first plurality of nano-particles. Next, in a third step 806, the first plurality of nano-particles is transferred from the first template to the first substrate to form the first liquid crystal alignment layer on the first substrate. Then, in a fourth step 808, a second template including a second nano-pattern corresponding to a second liquid crystal alignment layer is provided. Next, in a fifth step 810, the nano-pattern corresponding to the second liquid crystal alignment is coated with a second plurality of nano-particles. Then, in a sixth step 812, the second plurality of nano-particles is transferred from the second template to the second substrate to form the second liquid crystal alignment layer on the second substrate.

The description of particular embodiments of the present invention is now complete. Many of the described features may be substituted, altered or omitted without departing from the scope of the invention. For example, the liquid crystal alignment layers and methods of producing them can be employed in liquid crystal display devices other than reflective LCoS display devices. As another example, alternate printing methods can be substituted for the nano printing processes disclosed herein. These and other deviations from the particular embodiments shown will be apparent to those skilled in the art, particularly in view of the foregoing disclosure.

We claim:

1. A method of manufacturing a liquid crystal display, said method comprising:
providing a substrate of said liquid crystal display;
applying a liquid crystal alignment pattern to said substrate using a lithography process; and
assembling said substrate into said liquid crystal display with said liquid crystal alignment pattern of said substrate adjacent a liquid crystal layer of said liquid crystal display; and wherein
said liquid crystal alignment pattern is formed from Germanium-containing nano-particles;
said liquid crystal display is a liquid crystal on silicon (LCOS) device;
said substrate is a reflective backplane of said LCOS device; and
said lithography process is a nano offset printing including
providing a template;
patterning a nano-pattern onto said template, said nano-pattern including a plurality of parallel lines having a pitch no greater than 20 nm;
adhering said nano-particles onto said nano-pattern on said template; and
transferring said nano-particles to said substrate to form said liquid crystal alignment pattern on said substrate, said liquid crystal alignment pattern corresponding to said nano-pattern.

2. The method of claim 1, further comprising:
providing a second substrate of said liquid crystal display;
applying a liquid crystal alignment pattern to said second substrate using a lithography process; and
assembling said second substrate into said liquid crystal display with said liquid crystal alignment pattern of said second substrate adjacent said liquid crystal layer of said liquid crystal display.

3. The method of claim 2, wherein:
said second substrate is a transparent electrode of said liquid crystal display.

4. The method of claim 1, wherein said nano-particles are made from materials having a dielectric constant greater than the dielectric constant of polyimide.

5. The method of claim 1, wherein said nano-particles are made from materials having a dielectric constant greater than or equal to 7.

6. The method of claim 1, wherein said liquid crystal alignment pattern is formed from nano-particles including at least one of Germanium, Germanium Oxide and Silicon-Germanium alloy.

7. The method of claim 1, wherein said liquid crystal alignment pattern is formed from nano-particles including at least one of Silicon-Carbon alloy and Germanium-Carbon alloy.

* * * * *